(12) United States Patent
Vetter et al.

(10) Patent No.: US 12,479,673 B2
(45) Date of Patent: Nov. 25, 2025

(54) METHOD AND DEVICE FOR FORMING STACKS OF PACKAGES

(71) Applicant: Teepack Spezialmaschinen GmbH & Co. KG, Meerbusch (DE)

(72) Inventors: Holger Vetter, Korschenbroich (DE); Wolfgang Reichel, Willich (DE)

(73) Assignee: Teepack Spezialmaschinen GmbH & Co. KG, Meerbusch (DE)

( * ) Notice: Subject to any disclaimer, the term of this patent is extended or adjusted under 35 U.S.C. 154(b) by 0 days.

(21) Appl. No.: 18/617,110

(22) Filed: Mar. 26, 2024

(65) Prior Publication Data

US 2024/0327139 A1    Oct. 3, 2024

(30) Foreign Application Priority Data

Mar. 27, 2023    (EP) ..................................... 23164274

(51) Int. Cl.
*B65G 57/30*    (2006.01)
*B65B 41/16*    (2006.01)

(52) U.S. Cl.
CPC ............ *B65G 57/302* (2013.01); *B65B 41/16* (2013.01)

(58) Field of Classification Search
CPC ........... B65B 23/14; B65B 5/06; B65B 5/106; B65B 63/02; B65B 35/04; B65B 35/52; B65B 35/50; B65H 2301/42122; B65H 31/3054; B65G 57/30; B65G 57/302; B65G 57/305; B65G 57/301; B65G 57/303
See application file for complete search history.

(56) References Cited

U.S. PATENT DOCUMENTS 5,081,816 A * 1/1992 Cardinali ................ B65B 61/20
53/157
5,299,907 A * 4/1994 Dal Pozzo ......... B65G 47/5181
198/370.01

FOREIGN PATENT DOCUMENTS

DE    29724269 U1 *    8/2000    ............ B42C 19/08
EP    0064709 B1    8/1985
WO    WO-03062063 A1 *    7/2003    ............ B65B 35/52

* cited by examiner

*Primary Examiner* — Gregory W Adams
(74) *Attorney, Agent, or Firm* — Dorsey & Whitney LLP (57) ABSTRACT

A method and a device for forming stacks of packages by stacking infusion bags is disclosed. In one example, the method includes removing an individual infusion bag from a conveying stretch, on which individual infusion bags are fed, to a removal station. The individual infusion bags, guided by a vertically movable push-in device in a stacking stroke of said push-in device, are transferred into a buffer storage chute of said stack holding device. In a transfer stroke of said push-in device, which is greater than said stacking stroke, an infusion bag completing said stack of packages is raised off of said conveying stretch and transferred into a cartridge storage chute of said stack holding device.

14 Claims, 5 Drawing Sheets

METHOD AND DEVICE FOR FORMING STACKS OF PACKAGES

CROSS REFERENCE TO RELATED APPLICATIONS

This application claims priority under 35 U.S.C. § 119 (a) to European Patent Application Number 23164274.5, filed 27 Mar. 2023, which is hereby incorporated by reference herein in the entirety and for all purposes.

FIELD

The present invention relates to a method for forming stacks of packages by stacking infusion bags and to a device suitable for carrying out the method.

BACKGROUND

A device for packaging bag packages is known from EP 0 064 709 B1. It has stacking devices arranged on a star handle, into which the bag packages are inserted from below. This is done by plates provided on counter-rotating turrets which lift a bag package from below from a conveying stretch and transfer it into the stack holding device. The stack holding device is configured to have two parts and has a lower buffer storage chute and a cartridge storage chute provided thereabove which can be moved into a cardboard packaging by pivoting the star handle for further packing the stack. To form the stack, the plates must each be aligned horizontally. The plates each push the subsequent bag into the buffer storage chute. Closing flaps that are provided on motor-driven pivot arms are in a waiting position there. A counter counts bag packages introduced into the stack. The bag packages that pass this counter are inevitably raised by the turrets and supplied to stacking. Once the number of bag packages to be included in the stack has been reached, the counter gives a signal for moving a lifting plate, which is initially disposed below the stack chute, in a horizontal direction between the stack and the conveying stretch. This lifting plate raises the bag packages contained in the buffer storage. The flaps move to their closed position. The lifting plate is then returned to its waiting position.

In a method known from EP 2 812 250 B1, individual infusion bags are removed from a conveying stretch that interacts with a circulating conveyor belt which feeds the individual previously produced infusion bags from a bag production device to a stacking station in which the bags are stacked to form a stack of packages. The aforementioned prior art has a feed stretch that is formed by two conveyor belts extending in parallel that clamp the respective infusion bags between them and that removes the individual infusion bags from a conveying stretch and feeds them to an introduction station in which several infusion bags are stacked to form a stack of packages. A pivotable arm is provided for this purpose and removes the individual infusion bags from the feed stretch at a right angle to the direction of motion of the conveyor belts and feeds them to a stack holding device that holds the stack of infusion bags with a stacking axis that corresponds to the horizontal direction.

An alternative solution is known from DE 10 2015 115 732 A1. In this prior art, infusion bags are separated on a horizontally extending production stretch by cutting a bag material that forms the wrapping of the infusible material. Immediately downstream of the respective cutting device, the individual infusion bags drop into a receptacle mounted to be rotatable. From there, the individual bag is transferred by way of a punch into a magazine which is arranged below the receptacle and in which the bags are deposited on top of one another with a stacking axis in the vertical direction. The receptacle has wedge surfaces with which the ejected infusion bag is centered within the receptacle. Pushers are provided below the receptacle and close the underside of the receptacle in order to prevent the infusion bags from unintentionally dropping out of the receptacle and are opened synchronously with the advancing punch.

In this prior art, the receptacle also serves as a buffer storage for ejected infusion bags in the event that the magazine is not provided below the receptacle and the stack of packages stacked there is removed from the stack holding device. In this case, the pushers are moved together and close the lower opening of the receptacle.

According to EP 3 431 400 A1, a chain of connected infusion bags is folded over a star wheel after every two infusion bags so that two infusion bags are placed against two preceding infusion bags and in this way transferred to a horizontal stacking chute in the form of stacks of packages. The individual stacks of packages are advanced in the stacking chute by tines which are entrained by rotating belts that laterally define a stacking chute, and are fed to a pusher which transfers the stack of packages into a cardboard packaging.

The previously known solutions leave something to be desired.

BRIEF SUMMARY

The present invention is based on the object of specifying a device for the formation of stacks of packages containing infusion bags which is compact in structure and allows for simple and reliable stacking of infusion bags. The method is to enable stacks of packages to be formed quickly by stacking infusion bags and is accordingly to be able to be carried out economically and in a space-saving manner.

For satisfying the aspect of the method of the above object, a method for forming stacks of packages by stacking infusion bags is proposed, in which a single infusion bag is removed from a conveying stretch on which individual infusion bags are fed at a distance from one another and one behind the other to a removal station in which said infusion bags are arranged abutting against one another for forming said stack of packages in a stack holding device which is emptied when a number of infusion bags forming said stack of packages has been reached, wherein an individual infusion bag is raised off of said conveying stretch and transferred to a stack holding device. In said method said individual infusion bags guided by a vertically movable push-in device in a stacking stroke of said push-in device is transferred into a buffer storage chute of said stack holding device and in that, in a transfer stroke of said push-in device which is greater than said stacking stroke, an infusion bag completing said stack of packages is raised off of said conveying stretch and transferred into a cartridge storage chute of said stack holding device.

In the method, the individual infusion bag is arranged in a stack holding device in the context of the removal motion by the conveying stretch for the formation of the stack of packages. Accordingly, the infusion bag is transferred directly from the conveying stretch to the stack holding device. The conveying stretch is there that stretch that discharges the completed infusion bag from the bag production device and feeds it directly to a removal station in which the infusion bag is removed from the conveying stretch which is typically formed by a conveyor belt. The removal process is there performed by a removal device which acts upon the infusion bag in order to introduce it into the stack holding device. The removal device there also regularly causes the bags to be stacked in the stack holding device.

Like in the case of the solutions known from prior art, the stack holding device is movable at least in part in order to transfer it from a stacking position to an output position in which the stack of packages is removed from the stack holding device. The stack of packages there consists of a predetermined number of infusion bags. The stacks of packages produced consecutively each consist of an identical number of infusion bags.

The removal device can be provided with a counter and a sensor that is data-connected to a control device for the removal device in order to only activate the removal device when a receptacle space on the conveying stretch is in fact occupied by a completed infusion bag. The signal from the sensor and/or the actuation of the removal device can serve as a counter for those infusion bags entering into a machine control device with which the stack of packages is completed and the stack holding device is therefore transferred from the stacking position to the output position for emptying.

Likewise, a device can be provided which detects a faulty infusion bag, for example, disposed on the conveying stretch, and omits the activation of the removal device when this faulty bag passes the removal station. This prevents the faulty bag from becoming part of the stack of packages.

The completed bag is fed from the bag production device causing this directly via the one conveying stretch to the removal station where the infusion bag is removed from the conveying stretch. The removal process is performed in a predetermined controlled manner by the removal device. Moving the bag directly into the stack holding device in the framework of the removal motion shortens the paths of motion. After being removed from the conveying stretch, the infusion bag is there handled only once for transferring it to the stack holding device.

In departure from the method according to DE 10 2015 115 732 A1, in which the infusion bag drops from the conveying stretch downwardly into the receptacle under the effect of gravity, the infusion bag according to the present invention is raised off of the conveying stretch and transferred to the stack holding device. The active removal device there accordingly imposes a fixedly predefined path of motion upon the infusion bag that is determined by the motion of the removal device. Contrary to prior art DE 10 2015 115 732 A1, the path of motion is not dependent on various factors such as the weight of the infusion bag or the speed of the conveyor belt, respectively.

The method according to the present invention then proves to be time-saving and space-saving. Compared to prior art, fewer system components are required to form a stack of packages.

The solution according to the invention also takes into account in an improved manner the space available which is typically provided adjacent to the bag production device. By raising the infusion bag, the stack of packages is provided at a greater distance from the installation surface on which the bag production device is set up, which meets the need for ergonomic work by the operating staff.

In a preferred procedure, the individual infusion bag is transferred by way of a stacking stroke to a buffer storage chute of a buffer storage. This buffer storage chute is typically part of the stack holding device. The buffer storage chute can be provided in a stationary manner. It is aligned with a cartridge storage chute which is typically configured to receive the overall stack of packages.

In the preferred procedure, an infusion bag completing the stack of packages is raised in a transfer stroke off of the conveying stretch. This transfer stroke is greater than a stacking stroke. Each stacking stroke is typically sized the same, namely such that the infusion bag raised off of the conveying stretch reaches into the buffer storage chute and pushes the infusion bag or bags already present there upwardly against gravity. During the transfer stroke, the infusion bag that completes the stack of packages is first fed to the remaining infusion bags in the stack within the buffer storage. The completed stack of packages is there transferred with a uniform motion into the cartridge storage chute. This means that the buffer storage chute is emptied and all of the previously stacked infusion bags forming the stack of packages are placed in the cartridge storage chute. The cartridge storage chute is used to transfer the stack of packages for packing them in a cardboard packaging. As previously mentioned, the cartridge storage chute can be movable between the previously described stacking position, in which the cartridge storage chute is aligned with the buffer storage chute, and the output position. The cartridge is typically mounted to be pivotable for this purpose.

In the preferred procedure, the transfer stroke is followed by a stacking stroke with which an infusion bag that's is subsequent on the conveying stretch is transferred to the buffer storage, while the cartridge is at the same time typically emptied over the duration of several stacking strokes in order to transfer the stack of packages, for example, into a cardboard packaging.

The method according to the invention can be carried out particularly economically and effectively by rapid motions, in particular of the removal device. In view of this, it is preferable to quickly slow down the motion of the infusion bag within the stack holding device so that the removal device can be quickly prepared for the next stroke and orderly stacking of the individual infusion bags in the stack holding device can be ensured. In view of this, the infusion bags are preferably stacked against the resistance of a resistance element which is movable in the stack holding device. This movable resistance element slows down the infusion bag and ensures that the individual infusion bags bear against each other in an orderly manner within the stacking device.

The invention also provides a device for forming stacks of packages by stacking individual infusion bags, with a conveying stretch on which infusion bags are conveyed from a bag production device to a removal station, a removal device associated with said removal station and a stack holding device for holding a stack of infusion bags, where said removal device is configured to be adapted to move a single infusion bag from said conveying stretch to said stack holding device which comprises a buffer storage with an buffer storage chute configured to receive a stack of infusion bags and a cartridge arranged on the side of said buffer storage facing away from said conveying stretch with a cartridge storage chute configured to receive a stack of infusion bags, where said cartridge is movable between a stacking position in which said buffer storage chute is aligned flush with said cartridge storage chute, and a removal position in which a stack is removed from said cartridge. Said removal device comprises movable pushers guided in the vertical direction and provided on both sides of said conveying stretch which are translationally movable from an initial position at the level of said conveying stretch for introducing an infusion bag resting on said pushers into said stack holding device to an introduction position above said conveying stretch, where said pushers receive said conveying stretch between them when transferring to said Introduction position.

The device typically has a bag production device in a manner known per se, in which loose infusible material, such as in particular tea, is enclosed in a bag made of material that is permeable to water to form the infusion bag. A label is typically attached to the bag by way of a thread. The label is typically secured to the bag. The bag can also be provided with aroma packaging. Such a bag production device is known, for example, from EP 4 046 923 A1.

The completed infusion bags, optionally provided with aroma packaging, are conveyed from this bag production device via a conveying stretch, which is typically formed by a circulating conveyor belt, to a removal station. A removal device is associated with this removal station. The device according further has a stack holding device for holding a stack of infusion bags. The removal device is configured to be adapted to move an individual infusion bag from the conveying stretch to the stack holding device.

The removal device has a push-in device that is guided in a vertical direction, preferably with pushers provided on both sides of the conveying stretch. The push-in device or the pushers, respectively, are movable from an initial position at the level of the conveying stretch for introducing an infusion bag into the stack holding device. This stack holding device is disposed above the conveying stretch. The infusion bag moved by the removal device in this regard typically rests on both pushers, i.e. it is being contacted on both sides of the conveying stretch and raised off of the conveying stretch and transferred in the direction of the stack holding device. This position of the removal device is referred to as the introduction position. In the introduction position, the infusion bag is raised to such an extent that it is inserted into the stack holding device.

Accordingly, the pushers of the device typically receive the conveying stretch between them. Each of the pushers is typically supported by way of elongated supports which can be mounted on a common carriage which is driven to be vertically movable and remains below the conveying stretch also in the introduction position. In this manner, synchronous actuation of the pushers is ensured in a simple manner and the arrangement of the individual pushers each at the same height is also ensured.

In the proposed procedure, the infusion bag is typically moved solely vertically. For this purpose, the pushers have a bearing surface for the infusion bag that typically extends solely horizontally. The conveyor belt that preferably forms the conveying stretch is typically moved continuously. The infusion bag raised off of the conveying stretch is typically slowed down by a stop of the pusher which defines the bearing surface and against which the infusion bag impacts when the pusher is in the initial position.

With regard to the possibility of discharging infusion bags that have been identified as being faulty and preventing them from stacking, the pusher can preferably be moved to a discard position in which an infusion bag moved on the conveying stretch can be moved over and beyond the pushers without the stops striking the infusion bag. In this way, the faulty infusion bag can be conveyed over and beyond the pushers and be discharged from the device by the motion of the conveying stretch. The faulty infusion bag can be, for example, cast off of the conveying stretch at a deflection point of a conveyor belt.

According to a preferred development, the stack holding device has pawls disposed opposite one another in the region of its insertion opening. They are mounted to be pivotable on a stacking chute and are typically affixed in ma spring-loaded manner in a holding position. In this holding position, the pawls each form a bearing surface for the lowermost infusion bag within the stack holding device.

The pawls have funnel surfaces facing each other on their underside that faces the conveying stretch. Due to these funnel surfaces, the pawls are pivoted outwardly by the infusion bag or at least a surface of the removal device when the infusion bag is inserted into the stacking chute. Due to the spring preload, the pawls are then pivoted back to the holding position so that the infusion bag that was introduced last into the stacking chute is prevented from dropping out of the stacking chute by the bearing surfaces of the pawls. The pawls then firmly hold the infusion bag transferred with the stacking stroke or the lowermost bag of the stack placed into the cartridge with the transfer stroke, respectively, in the respective cute, while the push-in device is lowered out of the respective chute in the direction of the conveying stretch after the stacking stroke or after the transfer stroke, respectively.

It goes without saying that the pawls are preferably pivotable about an axis which extends parallel to the elongate pushers.

As already explained with reference to the method, the stack holding device can preferably have a buffer storage with a buffer storage chute configured to receive a stack of infusion bags. In this further development, a cartridge with a cartridge storage chute configured to receive a stack of infusion bags is provided on the side of the buffer storage chute facing away from the conveying stretch. The cartridge storage chute is configured to store at least a number of infusion bags forming the completed stack of packages.

The cartridge is movable between a stacking position in which the buffer storage chute is aligned flush with the cartridge storage chute and an output position in which the stack is removed from the cartridge. In this output position, the cartridge storage chute is typically not aligned flush with the buffer storage chute. Because the cartridge is typically pivotable to the output position from a vertical orientation of the cartridge storage chute to a substantially horizontal orientation of the same. A side surface of the cartridge storage chute can then be used to solidly support and guide the stack of packages when being output from the cartridge.

The pawls are typically provided both in the opening region of the buffer storage chute as well as in the opening region of the cartridge storage chute. The pawls can be driven or affixed electrically or pneumatically to open or close the insertion opening.

The pawls, in particular the pawls of the cartridge storage chute, can preferably be affixed in the holding position, for example, by way of an activatable pneumatic cylinder. By affixing the pawls in the holding position, the pawls are prevented from moving away from the holding position when the cartridge is transferred to the output position. The stack of packages is then securely enclosed in the cartridge storage chute.

The resistance element already discussed with regard to the proposed method can be formed, for example, by a carriage which is mounted to be slideable in a chute of the stack holding device, in particular the cartridge storage chute. Its weight slows down the motion of the infusion bags when the stack of packages is transferred into the cartridge storage chute and also keeps the individual infusion bags as a compact stack when the cartridge is transferred to the output position.

A corresponding resistance element can also be formed by a holding-down device which engages in a chute of the stack-holding device, in particular in the buffer storage chute, and which can be movable between a holding-down position, in which the holding-down device within the chute acts against the stacking there, and a resting position, in which the holding-down device is provided outside the chute. This holding-down device is typically led out of the buffer storage chute before the transfer stroke is carried out. The holding-down device can comprise at least one tine that engages in the buffer storage chute and is vertically slideable by way of a parallelogram structure, but is provided within the chute parallel to the surface of the uppermost infusion bag. This tine can act as a resistance element solely due to its own weight. The parallelogram structure can comprise a damper that dampens the pivoting motion of the articulated arms of the parallelogram structure.

DETAILED DESCRIPTION OF THE DRAWINGS

Further details and advantages of the present proposal shall become apparent from the following description of an embodiment in combination with the drawing, where.

DETAILED DESCRIPTION

Figure 1:
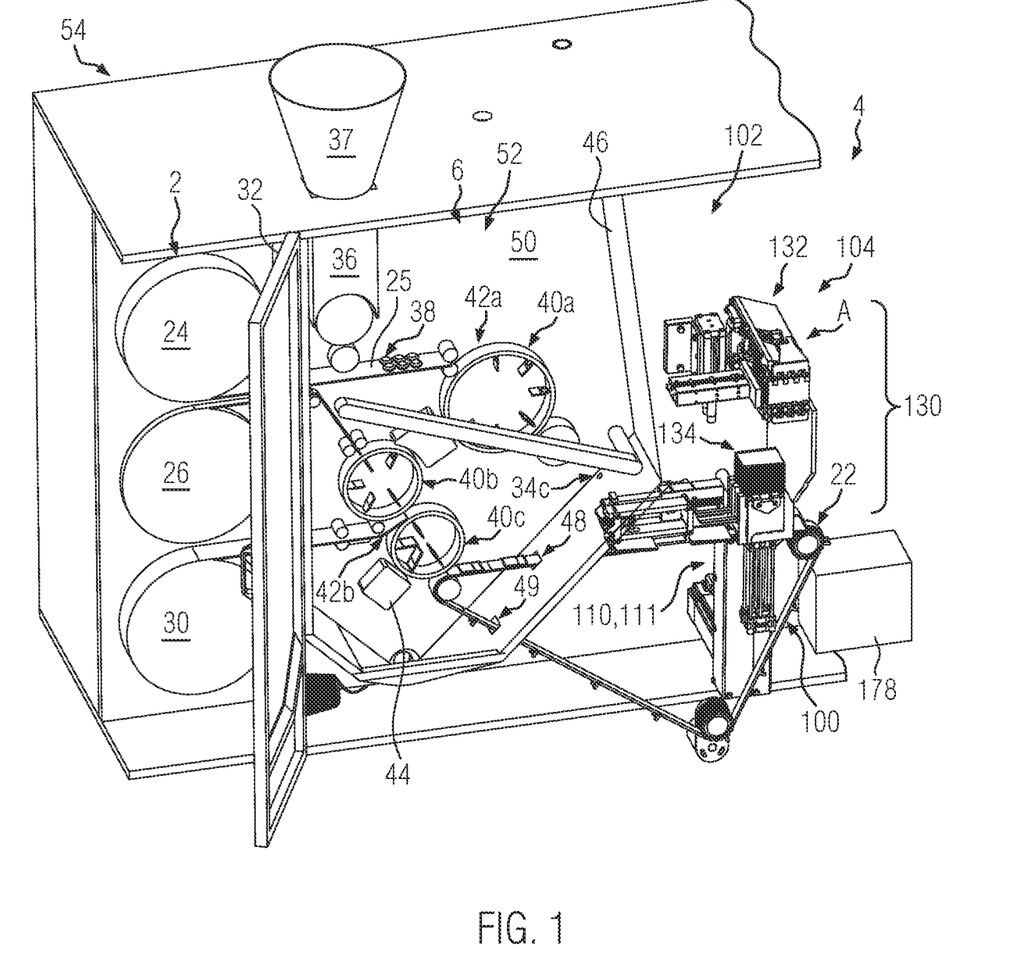
FIG. 1 shows a slightly perspective top view of an operating side of an embodiment of a bag production device with a device for forming stacks of packages.

FIG. 1 shows a slightly perspective top view onto an embodiment of a device for the production of bags filled with infusible material which has substantially three regions, namely a storage region 2 at the left-hand edge, a product region 4 at the right-hand edge, and a work region 6 between the storage region 2 and the product region 4.

Figure 17:
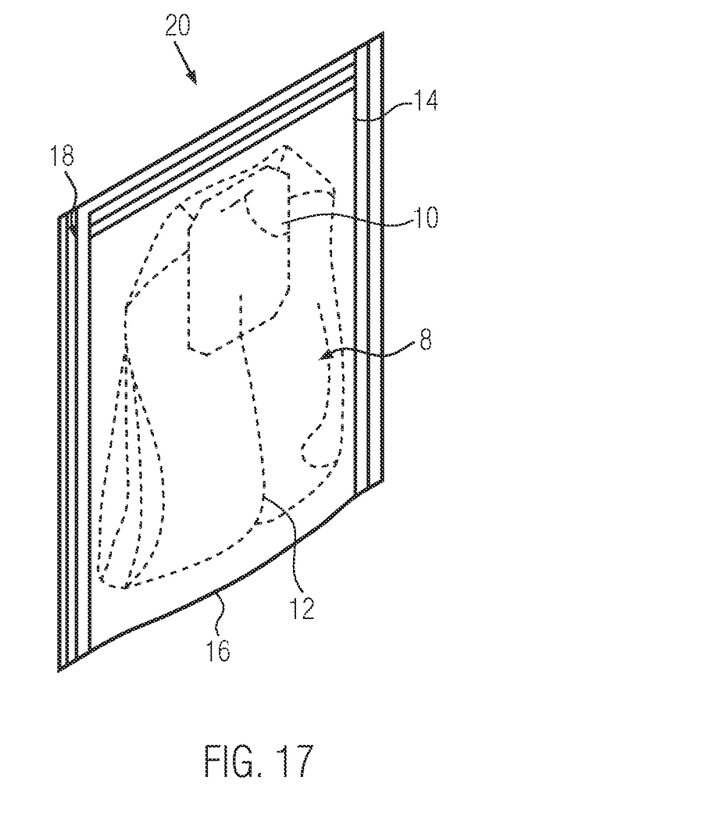
FIG. 17 shows a perspective side view of an embodiment of an infusion bag.

The bags are produced by removing consumable material from the storage region 2 which is processed to form bags in the work region 6. An example of such a bag is illustrated in FIG. 17. There, the bag is denoted by reference character 8. Reference character 10 denotes a label which is attached to the bag 8 by way of a thread 12. The entity of bag 8, label 10, and thread 12 is received in an aroma packaging 14 which is formed by film material that is impermeable to moisture and that is placed around the bag 8 at an edge 16 and is closed by a U-shaped weld seam 18.

Figure 2:
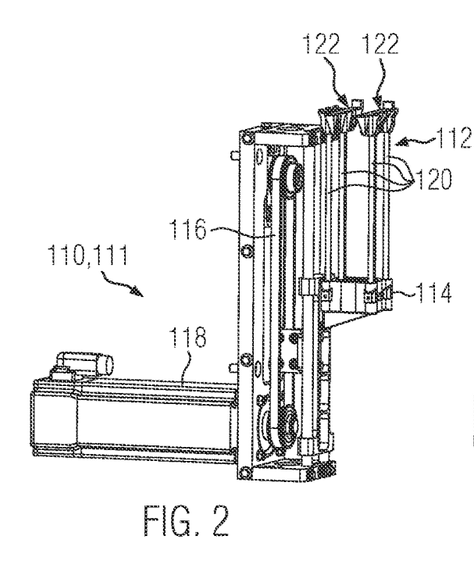
FIG. 2 shows a side view of a removal device of the embodiment in an initial position.

The product shown in FIG. 17 is referred to hereafter as a completed infusion bag 20. The completed infusion bag 20 is moved from the work region 6 to the product region 4 by way of a conveying stretch 22 in the form of a schematically illustrated conveyor belt, details of which can be gathered from FIG. 2ff. A removal station 104 which can be seen on the right-hand side in FIG. 1 is disposed at the end of this conveying stretch 22.

A supply 24 for bag material 25, a supply 26 for the labels 10, a supply 28 for the thread 12, and a supply 30 for the aroma packaging 14 which are used as consumable materials in the production of the completed infusion bags 20 can be seen in the storage region 2. These respective consumable materials are each provided on a roll and are rolled off therefrom in the course of production.

The storage region 2 has guides for the individual webs of consumable material. The consumable material is passed through a first partition wall 32 between the storage region 2 and the work region 6. This partition wall 32 comprises various openings for the passage of the respective consumable material. In the work region 6, a respective batch of the infusible material is placed on the bag material 25 at the height of a portioning device 36 with a supply 37 for infusible material. The bag material 25 is guided on a horizontal stretch 38. After the batch has been placed onto the bag material 25, the latter is formed into a tube containing the batch. The bag material 25 supplied as endless material is cut into length sections and thus separated. At the end of the horizontal stretch 38, the length sections of the bag material 25 prepared in this manner are transferred to a first transport wheel 40a.

At the height of an introduction station 42a, the bag material 25 is moved radially inwardly in the direction of the central longitudinal axis or the axis of rotation of the first transport wheel 40a in order to form the bag 8 configured as a double-chamber bag. The first transport wheel 40a rotates clockwise and feeds the respective bag material 25 to different stations in which the bag is closed at the top and attached to the thread 12 and the label 10.

The bag 8 thus created and processed at the top is transferred from the first transport wheel 40a to a second transport wheel 40b rotating in the counterclockwise direction, where the bag 8 is pivoted between the two transport wheels 40a, 40b such that the bottom of the bag 8 is introduced first in the radial direction into the second transport wheel 40b. The bag 8 is there attached to the label 10 and is rotated within the second transport wheel 40b such that the bottom of the bag 8, which is oriented radially inwardly when introduced, is oriented radially outwardly. In this orientation, i.e. pivoted by 180° relative to the direction of introduction, the bag 8 prepared in this manner is conveyed out of the second transport wheel 40b with the bottom facing forward and fed to a third transport wheel 40c. The bag is fed to a wrapping station 42b in which the aroma packaging 14 is placed around the bag 8 as well as the label 10 and the thread 12 when the edge 16 is formed. Thereafter, the aroma packaging 14 is sealed in a in a schematically indicated sealing station 44 while forming the U-shaped seam 18 according to FIG. 17. The sealing station 44 is associated with a third transport wheel 40c at which the bag 8 is held and transported during the sealing process.

The completed bag 20 thus produced is finally placed onto the conveying stretch 22 and fed to the product region 4. For this purpose, a second partition wall 46 comprises a bag passage opening 48 and a return opening 49 for the conveying stretch 22.

The components previously described as part of the work region 6 are disposed forward of a base plate 50 which carries the individual components and, possibly, separates them from drives that are provided on the oppositely disposed side of the base plate 50. The region of the base plate 50 facing the user separates an operating side 52 provided there from a drive side 54 on the rear side of the device.

Figure 5:
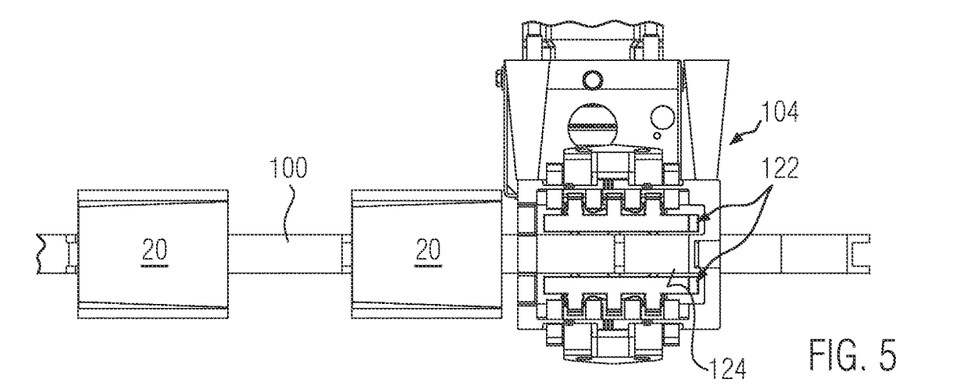
FIG. 5 shows a perspective side view of a buffer storage of the embodiment.
Figure 6:
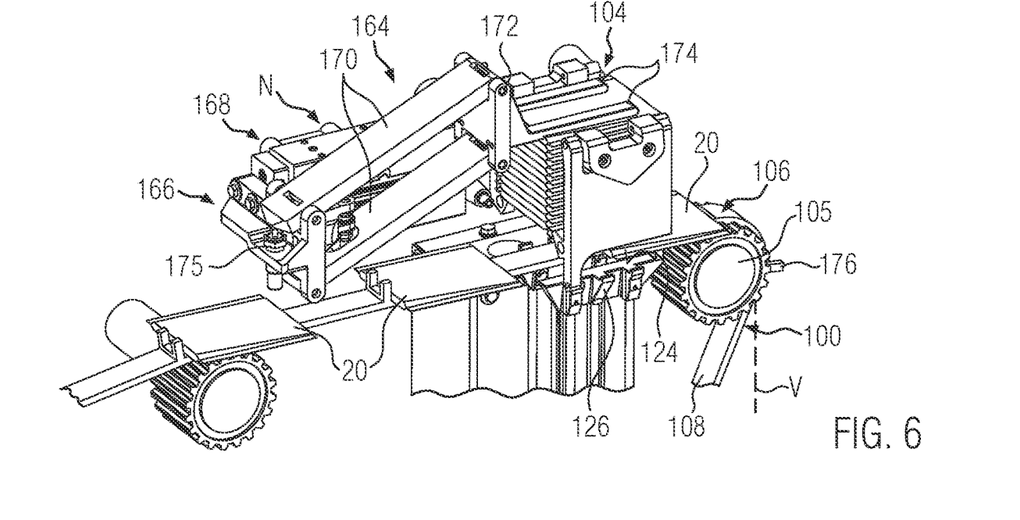
FIG. 6 shows a perspective side view of the detail according to FIG. 5 with the holding-down device of the embodiment in a raised holding-down position, where a cartridge provided above the buffer storage is not shown for a better representation of a holding-down device.

FIGS. 5 and 6 show parts of a conveyor belt 100 forming the transport stretch 22 according to FIG. 1 which connects a bag production device marked with reference character 102 in FIG. 1 to the removal station 104. In the removal station 104, the conveyor belt 100 is deflected by way of a deflection wheel 105 so that a section of the conveyor belt 100, denoted by reference character 106 and extending substantially horizontally, is deflected downwardly. The deflected section 108 provided in the conveying direction downstream of the deflection wheel 105 is deflected beyond the vertical direction, which is denoted by reference character V in FIG. 6.

Figure 3:
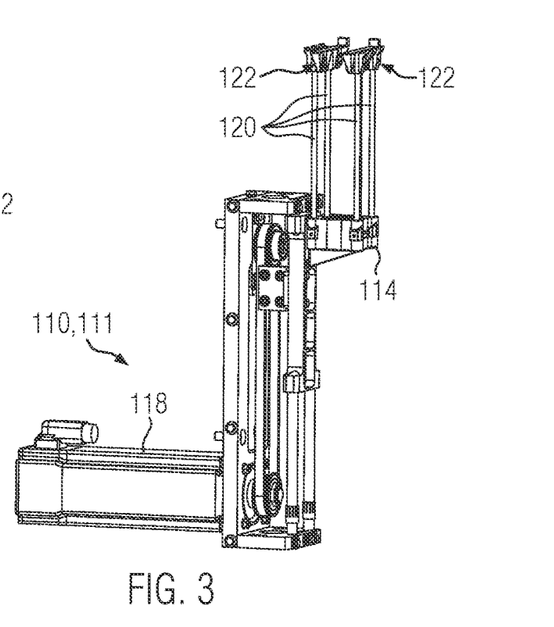
FIG. 3 shows the removal device according to FIG. 2 in an introduction position.

Provided in the direction of this vertical V below the conveyor belt 100 are the elements of a removal device 110 mounted in a stationary manner and are shown in detail in FIGS. 2 and 3. This removal device 110 has a push-in device 111 with an insertion guide 112 which guides a carriage 114 in the vertical direction that is drivingly coupled 118 by way of a circulating toothed belt 116 to the shaft of a servomotor. The carriage 114 carries supports 120. Two of the supports 120 each carry a single pusher 122. This pusher 122 has a flat bearing surface 124 and in the direction of motion of the conveyor belt downstream thereof has a stop 126.

As shown in FIG. 1, disposed on the side of the conveyor belt 100 opposite the removal device 110 is a stack holding device 130 which comprises a cartridge 132 and a buffer storage 134. In FIG. 1, the cartridge 132 is shown in its output position A in which the cartridge 132 is pivoted by 90 degrees in the horizontal direction relative to a stacking position S which is shown in FIG. 7 and in which the cartridge 132 directly adjoins the buffer storage 134 and is aligned flush therewith (cf. FIGS. 12, 14, 16).

Figure 4:
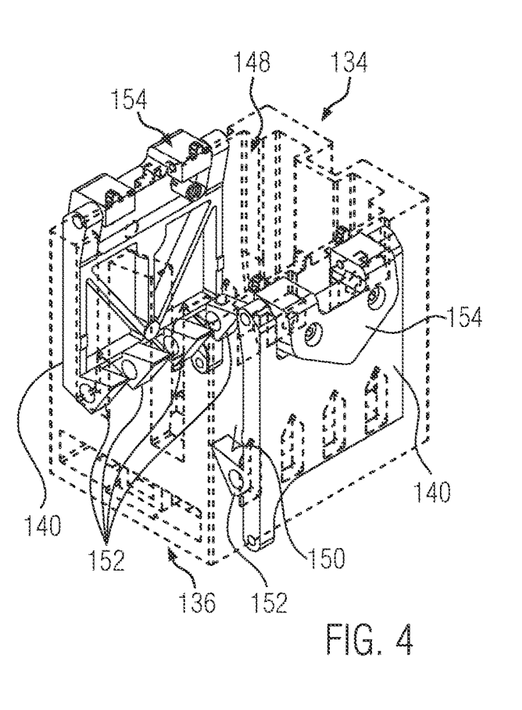
FIG. 4 shows a perspective side view of a buffer storage of the embodiment, where a housing of the buffer is shown only in dashed lines for a better representation of pawls.
Figure 7:
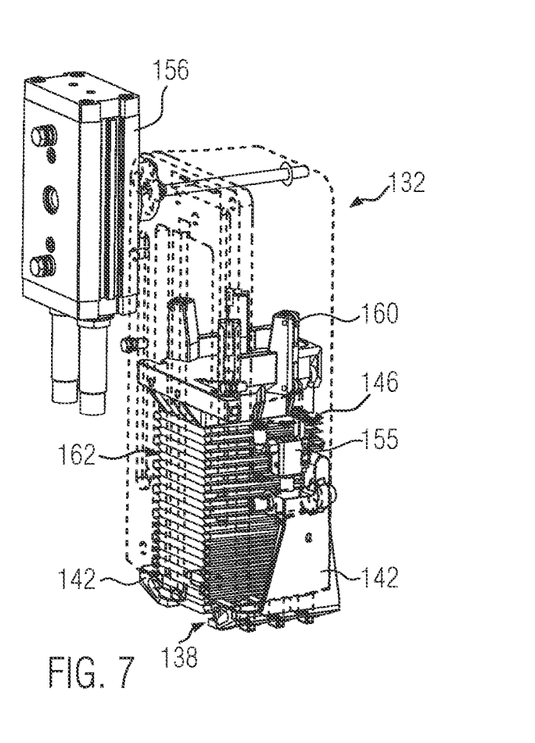
FIG. 7 shows a perspective side view of the cartridge of the embodiment, where a housing of the cartridge is shown only in dashed lines for a better representation of a carriage.
Figures 15, 16:
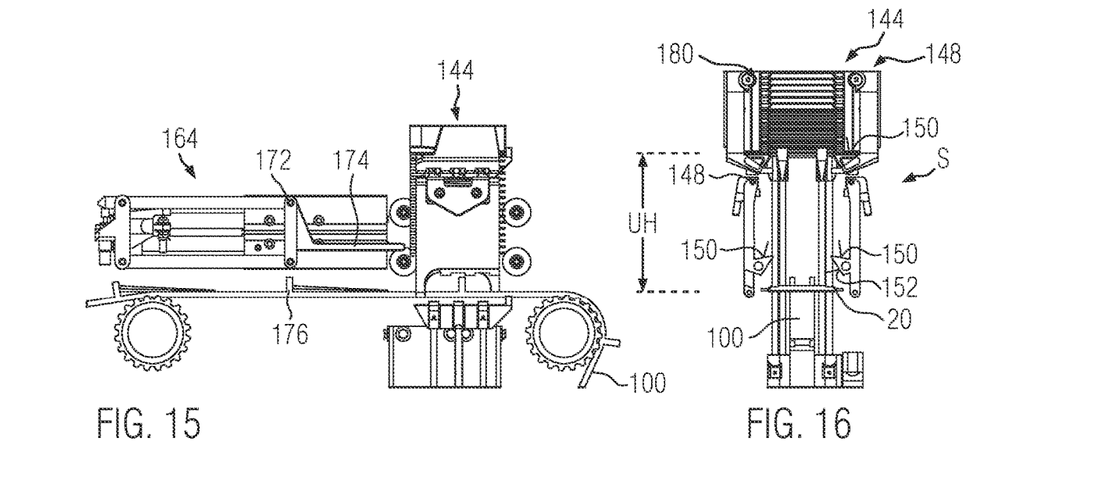
FIG. 15 shows a side view according to FIG. 13 before the first infusion bag has been transferred into the buffer storage with the holding-down device in a lowered resting position.
FIG. 16 shows a face side view of FIG. 15.

Details of the buffer storage 134 can be gathered from FIG. 4; details of the cartridge 132 from FIG. 7. These parts of the stack holding device 130 each have pawls 140, 142 which are mounted to be pivotable at their respective insertion openings 136, 138 and which form the access to a stacking chute 144. As shown in FIGS. 15 and 16, this stacking chute 144 is formed in part by a cartridge storage chute 146 of the cartridge 132 and in part by a buffer storage chute 148 of the buffer storage 134.

In the stacking position S shown in FIGS. 11 to 16, the cartridge storage chute 146 is aligned flush with the buffer storage chute 148.

The pawls 140 and 142 are each pretensioned by a spring such that bearing surfaces 150 respectively formed by oppositely disposed pawls 140; 142 define the corresponding chute 146, 148 on the underside, whereas the clear distance of the pawls 140; 142 in the region of the insertion opening 136, 138 is smaller than the respective width of the infusion bag 20. The pawls 140, 142 on their underside facing the conveyor belt 100 each have funnel surfaces 152 directed towards one another.

The spring preload is embodied, for example, for the pawls 140 of the buffer 134 by spring elements which are provided between the outer surface of the pawl 140 and a spring holder 154 provided for this purpose (cf. FIG. 4). The pawls 142 of the cartridge 132 can additionally be affixed in their holding position, for which purpose a pneumatic plunger 155 is provided which acts upon the pawl 142 when activated and affixes it in the position closing the cartridge storage chute 146. As a result, the cartridge storage chute 146 remains narrowed on the underside by the pawls 142 such that the lowermost infusion bag 20 disposed in the cartridge storage chute 146 rests on the bearing surfaces 150 and cannot unintentionally drop out of the cartridge storage chute 146. This function is particularly important when transferring the cartridge from the stacking position S to the output position A.

For this motion, the cartridge 132 in the embodiment shown is pivotable by a pivot drive 156 which rotates a shaft on which the cartridge 132 in its stacking position S is suspended vertically downwardly; compare FIG. 7.

In this figure, a carriage 160 can also be seen which is mounted to be freely slideable in the cartridge storage chute 146 and whose weight rests within the cartridge storage chute 146 on a stack marked with reference character 162. This carriage 160 is an example of a resistance element which slows down an infusion bag 20 introduced into the stacking chute 144 during insertion and keeps the stack 162 compact in the cartridge stacking chute 146.

A further example of such a resistance element is shown in FIG. 6 ff in the form of a holding-down device 164. The holding-down device 164 has a bearing element 166, which is attached to the movable end of a pneumatic cylinder 168 such that the bearing element 166 can be moved from a holding-down position N according to FIGS. 6, 8, 11 to a resting position R according to FIGS. 13, 15. Two pivot arms 170 of a parallelogram structure are mounted to be pivotable at the bearing element 166. At their other end, these pivot arms 170 are connected to a connecting element 172 from which tines 174 project. In the holding-down position N, these tines 174 are disposed within the storage chute 148. In the resting position R, the tines 174 are disposed at the side next to the buffer storage chute 148; compare FIGS. 13, 14. Raising the tines 174 is dampened by a damper 175.

To form stacks of packages with the embodiment shown, individual infusion bags 20 are placed by the bag production device 102 with a spacing onto the conveyor belt 100. For this purpose, the conveyor belt 100 is provided at regular intervals with cams 176 which entrain the respective infusion bag 20; compare FIG. 6. A visual inspection of the infusion bag 20 is carried out on the way to the removal device 110. If the former is found to be not correct during the inspection, then the pusher 120 remains in the discard position U, which can be clearly seen in particular in FIG. 12, in which the pusher 122 is disposed lower overall than the infusion bag 20. The bag can accordingly also pass the stops 126. The faulty infusion bag 20 downstream of the deflection wheel 105 is dropped from the conveyor belt 100 into a collecting container 178. Such a faulty infusion bag 20 is shown on the right-hand side in FIGS. 6, 8, 11 and 13 and therefore in the conveying direction of the conveyor belt 100 downstream of the removal station 104.

In the general case in which the infusion bag 20 passes the final inspection, the pusher 122 is moved from this discard position U to a slightly raised initial position in which the pusher 122 raises the infusion bag 20 off the conveyor belt 100. Due to the horizontal direction of motion of the infusion bag 20 on the horizontal section 106 of the conveyor belt 100, the infusion bag 20 as part thereof strikes against the stop 126. In the context of the raising motion, the infusion bag 20 is introduced into the buffer storage chute 148. The pawls 140 are there pivoted outwardly so that the infusion bag 20 can be received in the buffer storage chute 148. This stacking stroke, indicated by reference character SH between FIGS. 9 and 10, for inserting a single infusion bag there typically ends immediately after the infusion bag 20 has passed the bearing surface 150 of the pawls 140 of the buffer storage chute 148. From this uppermost position, the pusher 122 is returned to the discard position U before the next infusion bag 20 is made available to the removal station 104 via the conveyor belt 100.

The motion of the pusher 122 occurs at high frequency. The infusion bag 20 is also introduced into the buffer storage chute 148 at high speed. To slow down and orderly deposit and stack the individual infusion bags 20, the tines 174 of the holding-down device 164 are disposed within the buffer storage chute 148 and in the holding-down position.

Figure 8:
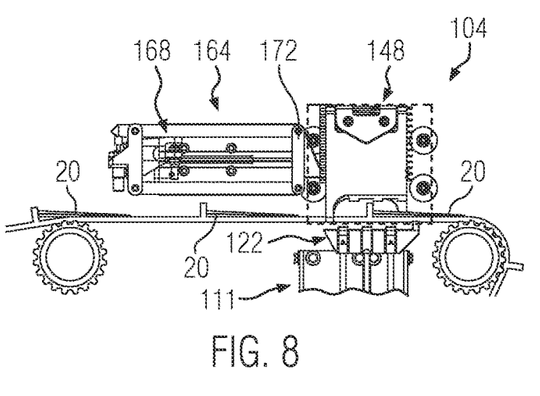
FIG. 8 shows a side view of FIG. 6 with the holding-down device in a lowered holding-down position.

At the start of the stacking process, the holding-down device 164 assumes the lowered position shown in FIG. 8. With each infusion bag placed in the buffer storage chute 48, the tines 174 are also raised. In addition to the own weight of the holding-down device 164, the damper 175 also promotes orderly stacking of the individual infusion bags 20 in the buffer storage chute 148.

Figures 9, 10:
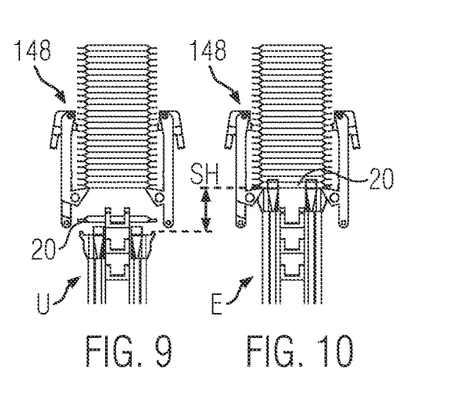
FIG. 9 shows a face side view of FIG. 8 with the removal device in a discard position.
FIG. 10 shows a face side view according to FIG. 9 with the removal device in an introduction position.

FIG. 9 shows the buffer storage chute 148 before the infusion bag 20 is introduced which is shown there still lying on the conveyor belt 100. The pusher 122 is disposed in the discard position U. According to FIG. 10, the pusher 122 is raised by way of the stacking stroke SH and is disposed in its Introduction position E in the insertion opening 136 of the buffer storage chute 148. It can be seen that the two pushers 122 receive the conveyor belt 100 between them at least in this Introduction position E.

Figure 11:
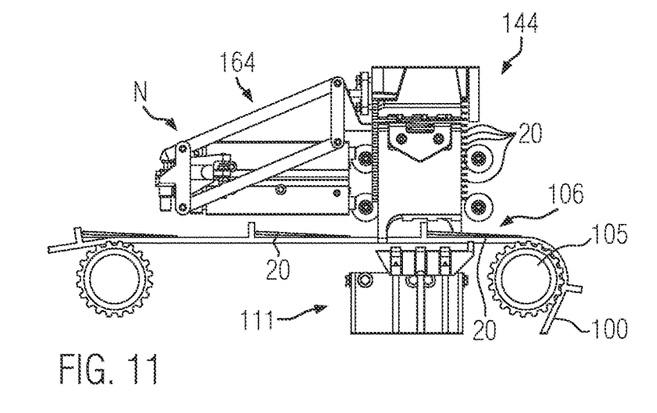
FIG. 11 shows a side view according to FIG. 8 with the holding-down device in a raised holding-down position.
Figure 12:
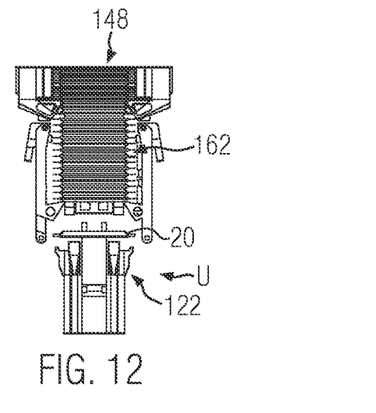
FIG. 12 shows a face side view of FIG. 11.

FIGS. 11 and 12 illustrate the growth of the stack 162 in the buffer storage chute 148 while the holding-down device 164 is raised simultaneously. Shortly before reaching the number of infusion bags 20 that make up a stack of packages, the holding-down device 164 slides horizontally from its holding-down position N shown in FIG. 11 to the resting position R shown in FIG. 13 by activation of the pneumatic cylinder 168. This is followed by a further stroke of the pusher to introduce an infusion bag into the stacking chute 144. During this further stroke, with which the last infusion bag 20 is raised off the conveyor belt 100 to complete the stack of packages, this last infusion bag 20 is moved to behind the pawls 142 of the cartridge storage chute 146. With this transfer stroke indicated by reference character UH between FIGS. 5 and 16, the stack 162 of infusion bags 20 that has grown to that point in the buffer storage chute 148 is raised by the infusion bag 20 that is still to be introduced so that the stack of packages as a whole is introduced into the cartridge storage chute 146 in one stroke.

Figure 13:
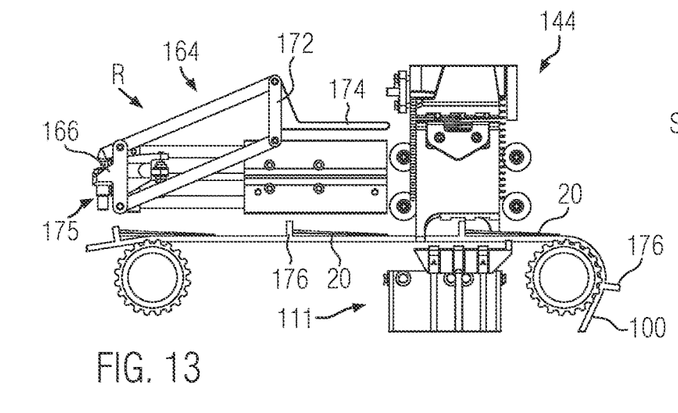
FIG. 13 shows a side view according to FIG. 8 after the stack of packages has been transferred to the cartridge with the holding-down device in a lowered resting position.
Figure 14:
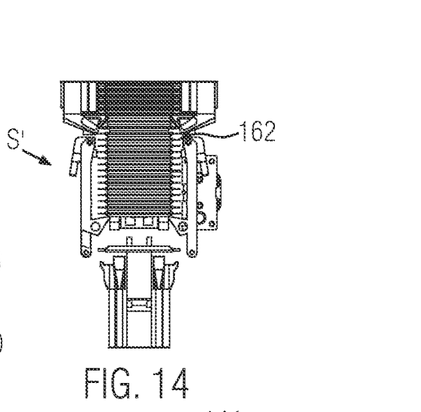
FIG. 14 shows a face side view of FIG. 13.

FIGS. 13 to 15 show the situation in which this last infusion bag 20 is still disposed on the conveyor belt 100. FIG. 16 illustrates the end position of the pushers 122 during the transfer stroke UH. The buffer storage chute 148 has been emptied. All infusion bags 20 are disposed as a stack of packages 180 in the cartridge storage chute 146. Between FIG. 13 and FIG. 15, the tines 174 have moved back to the lowered position due to their own weight. Following the transfer stroke UH and the retraction of the removal device 110 to the discard position U, the tines 174 are again arranged in the holding-down position N so that the next infusion bag 20, which ultimately forms the uppermost infusion bag of the stack of packages 180 to be subsequently stacked, is introduced against the tines 174 into the buffer storage chute 148 in the manner described above.

When the stack of packages 180 is transferred into the cartridge storage chute 146, the vertical motion of the stack of packages 180 is slowed down by the carriage 160. Its weight ensures that the individual infusion bags 20 are stacked in a compact manner within the stack of packages 180.

While further infusion bags 20 are stacked in the buffer storage chute 148, the cartridge 132 is pivoted to the output position shown in FIG. 1. The stack of packages 180 is removed. The cartridge 132 is thereafter again arranged in the stacking position S.

It can be seen that a new stacking stroke SH takes place immediately after the transfer stroke UH. The individual stacking strokes SH are identical. They are set such that the infusion bag 20 to be added newly to the stack 162 is moved behind the bearing surface 150 of the pawls 140. This infusion bag 20, which is newly added to the stack 162, pushes the stack 162 further upwardly in the buffer storage chute 148. This reduced distance of the removal device 110 for vertically raising the individual infusion bags 20 allows the stack of packages 180 to be produced quickly and therefore economically.

LIST OF REFERENCE CHARACTERS 2 storage region
4 product region
6 work region
8 bag
10 label
12 thread
14 aroma packaging
16 edge
18 sealing seam
20 completed infusion bag
22 conveying stretch
24 supply for bag material
25 bag material
26 supply for labels 10
28 supply for thread 12
30 supply for aroma packaging 14
32 first partition wall
34a opening for bag material
34b opening for labels
34c opening for thread
34d opening for aroma packaging
36 portioning device
37 supply for infusible material
38 horizontal stretch
40a first transport wheel
40b second transport wheel
40c third transport wheel
42a introduction station
42b wrapping station
44 sealing station
46 second partition wall
48 bag passage opening
49 return opening
50 base plate 52 operating side
54 drive side
100 conveyor belt
102 bag production device
104 removal station
105 deflection wheel
106 horizontal section
108 deflected section
110 removal device
111 push-in device
112 pusher guide
114 carriage
116 toothed belt
118 servomotor
120 support
122 pusher
124 bearing surface
126 stop
130 stack holding device
132 cartridge
134 buffer storage
136 introduction opening
138 introduction opening
140 pawl
142 pawl
144 stacking chute
146 cartridge storage chute
148 buffer storage chute
150 bearing surface
152 hopper surface
154 spring holder
155 plunger
156 pivot drive
160 carriage
162 stack
164 holding-down device
166 bearing element
168 pneumatic cylinder
170 pivot arm
172 connecting element
174 tine
175 damper
176 cams
178 collection container
180 stack of packages
A output position
E introduction position
F conveying direction
N holding-down position
R resting position
S stacking position
SH stacking stroke
U discard position
UH transition stroke
V vertical direction

What is claimed is:

1. A method for forming stacks of packages by stacking infusion bags, comprising:
conveying an infusion bag by a conveying stretch on which individual infusion bags are fed at a distance from one another and one behind the other to a removal station,
raising the infusion bag off of said conveying stretch and transferring the infusion bag to a stack holding device for accumulating multiple infusion bags one after another and abutting against one another to form a stack of packages,
guiding the infusion bag by a push-in device, the push-in device moving translationally in a vertical direction to form the stack of packages,
wherein the push-in device is moving in a stacking stroke or in a transfer stroke,
wherein in said stacking stroke, said infusion bag is transferred by said push-in device from said conveying stretch into a buffer storage chute of said stack holding device, and
wherein in said transfer stroke, an infusion bag completing said stack of packages is transferred by said push-in device from said conveying stretch into a cartridge storage chute of said stacking holding device when a number of infusion bags forming said stack of packages has been reached,
wherein the transfer stroke is greater than said stacking stroke.

2. The method according to claim 1, wherein an infusion bag raised off of said conveying stretch immediately after said transfer stroke is introduced into said buffer storage chute, while a cartridge forming said cartridge storage chute is emptied after the number of infusion bags forming said stack of packages has been reached.

3. The method according to claim 1, wherein when a faulty infusion bag is detected, said push-in device is moved to a discard position in which said faulty infusion bag moved on said conveying stretch is moved over and beyond said push-in device and the faulty infusion bag is removed from said conveying stretch downstream of said push-in device.

4. The method according to claim 1, wherein said infusion bags are transferred into said stack holding device against the resistance of a resistance element, which is movable at least during the stacking stroke, into said stack holding device.

5. A device for forming stacks of packages by stacking individual infusion bags, comprising:
a conveying stretch on which infusion bags are conveyed from a bag production device to a removal station,
a removal device associated with said removal station, and
a stack holding device for holding a stack of infusion bags,
wherein
said removal device is configured to be adapted to move a single infusion bag from said conveying stretch to said stack holding device,
the stack holding device comprises
a buffer storage with a buffer storage chute configured to receive the stack of infusion bags, and
a cartridge arranged on the side of said buffer storage facing away from said conveying stretch with a cartridge storage chute configured to receive the stack of infusion bags,
said cartridge is movable between a stacking position in which said buffer storage chute is aligned flush with said cartridge storage chute, and a removal position in which a stack is removed from said cartridge,
said removal device comprises movable pushers guided in a vertical direction and provided on both sides of said conveying stretch which are translationally movable from an initial position at the level of said conveying stretch for introducing an infusion bag resting on said pushers into said stack holding device to an introduction position above said conveying stretch, where said pushers receive said conveying stretch between them when transferring to said introduction position.

6. The device according to claim 5, wherein said pushers are configured to execute a stacking stroke in which said pushers are moved into said buffer storage chute, and a transfer stroke that is greater than said stacking stroke and in which said pushers are moved into said cartridge storage chute.

7. The device according to claim 6, wherein said buffer storage in a region of an insertion opening comprises oppositely disposed pawls which are mounted to be pivotable at said buffer storage and in a spring-loaded holding position form a bearing surface for a lowermost infusion bag within said buffer storage, where said stacking stroke ends at the level of said insertion opening of said buffer storage.

8. The device according to claim 6, wherein said cartridge in a region of an insertion opening comprises oppositely disposed pawls which are mounted to be pivotable at said cartridge and in a spring-loaded holding position form a bearing surface for a lowest infusion bag within said cartridge, where said transfer stroke ends at the level of said insertion opening of said cartridge.

9. The device according to claim 8, wherein said pawls are affixed in the holding position.

10. The device according to claim 8, wherein the pawls on their underside facing said conveying stretch form funnel surfaces directed towards one another.

11. The device according to claim 5, further comprising a carriage mounted to be slideable in a stacking chute of said stack holding device, in particular said cartridge storage chute.

12. The device according to claim 5, further comprising a holding-down device which in a holding-down position engages in a stacking chute of said stack-holding device, in particular said buffer storage chute, and which is slideable between said holding-down position in which said holding-down device acts from above against said stack and a resting position in which said holding-down device is provided outside said stacking chute.

13. The device according to claim 5, wherein each pusher comprises a bearing surface for said infusion bag and a stop downstream of said support surface and projecting over said bearing surface.

14. The device according to claim 13, wherein said pusher is movable to a discard position in which an infusion bag moved on said conveying stretch is moved over and beyond said pushers without striking said stops.

* * * * *